UNITED STATES PATENT OFFICE.

WILLIAM D. BREWSTER AND EUGENE A. ABELL, OF BINGHAMTON, NEW YORK; SAID ABELL ASSIGNOR TO SAID BREWSTER.

PROCESS OF PREPARING PIE-FILLINGS.

SPECIFICATION forming part of Letters Patent No. 508,598, dated November 14, 1893.

Application filed October 11, 1892. Serial No. 448,568. (No specimens.)

*To all whom it may concern:*

Be it known that we, WILLIAM D. BREWSTER and EUGENE A. ABELL, citizens of the United States, residing at Binghamton, in the county of Broome and State of New York, have invented certain new and useful Improvements in Processes of Preparing Pie-Fillings; and we do declare the following to be a full, clear, and exact description of the invention, such as will enable others skilled in the art to which it appertains to make and use the same.

Our invention relates to a process of preparing that particular class of preparations adapted to be used in making pies, cakes, &c., and our object is to provide a dry fruit pie preparation that can be put up and sold in packages, or in bulk, in a loose or granulated state.

A further object of our invention is to provide a method of making a preparation or compound that will cook more quickly so that pies and similar articles of food can be made more quickly than heretofore.

A still further object of our invention is to produce a mode of making a pie preparation that will retain its freshness, flavor and good qualities for a longer length of time, and which will not become polluted by the attacks of vermin.

A still further object is to operate so as to provide an article of greater variety that will not only be superior in quality to anything of the kind heretofore produced, but can be supplied to consumers at a lower price than green fruit can be procured and prepared by them ready for use.

To these ends our invention consists in the process for the preparation of a great variety of fruits, such as green apples, peaches, plums, apricots, and also various kinds of berries, such as cherries, raspberries, blackberries, &c., and in the use in said process of certain ingredients or elements which are applied thereto or commingled therewith in the peculiar manner now to be described.

For example in preparing the apple preparation, we first take a quantity of evaporated or dried apples, thoroughly assort them by removing therefrom all extraneous matter, such as cores, sticks, &c., after which they are subjected to a process of screening for the purpose of removing any remaining particles of objectionable matter. We next place them in a suitable apparatus and submit them to a thorough steaming process for the purpose of killing all insect germs, and to partially cook them, so that when cut into small pieces and treated, as hereinafter described, they will only require about five minutes' more cooking to finish them. After thus being steamed, they are placed in a suitable drying oven and thoroughly dried until all moisture is removed therefrom, thereby converting them into a condition to be more easily cut into small particles or granules. After being dried they are placed into a suitable cutting device and cut into small particles or granules. During this cutting operation, dry pulverized corn-starch is gradually added for the purpose of coating each granule or separate particle, thereby keeping them from adhering to each other, and insuring a perfectly dry compound. Our reason for cutting the fruit into small particles is to permit the heat in cooking to act more promptly, so that the preparation will become thoroughly cooked in the short time of about five minutes. In addition to rendering the preparation drier, the corn-starch serves to give the preparation body when baked. The next step is to place the fruit thus prepared into a suitable mixing receptacle and thoroughly mix it with dry granulated sugar, spices or other flavoring matter. The proportions usually employed in this apple preparation are twelve to fifteen pounds of corn-starch to one hundred pounds of fruit. To this we add from seventy to seventy-five pounds of sugar and from three to four pounds of mace, together with about one pound of salt. Regarding the preparation of the other kinds of fruits, the proportions of corn-starch, sugar and spices may be varied according to requirements and tastes. When the preparation is thus prepared it will be substantially free from moisture or stickiness, and the separate particles will not adhere to each other, thereby enabling the consumer to handle the compound in bulk or small quantities, and also permit it to be easily inspected for the purpose of detecting its quality. This loose and dry state of the compound results in preserving its purity by enabling it to be put up in sealed packages which exclude vermin.

Having thus described our invention, what we claim as new, and desire to secure by Letters Patent, is—

1. The herein described method of making a dry food preparation for pies, cakes &c., consisting of steaming evaporated or dried fruit to kill germs and partially cook the fruit, then thoroughly drying the fruit, then cutting the fruit into small particles, then treating the mass with pulverized corn starch to separate and prevent adhesion of the particles and give body to the preparation, lastly, further treating the mass with pulverized sugar which acts as a preservative of the compound.

2. The process of making fruit preparations for pies, cakes &c., which consists in first, steaming dried or evaporated fruit; secondly, drying the same; thirdly; cutting it into small particles or granules simultaneously with the addition of dry pulverized corn starch thereto; and fourthly, mixing the whole with dry granulated sugar, substantially as described.

In testimony whereof we affix our signatures in presence of two witnesses.

WILLIAM D. BREWSTER.
EUGENE A. ABELL.

Witnesses:
GEO. C. MORRIS,
S. M. MERCHANT.